(12) United States Patent
Lin

(10) Patent No.: US 10,816,758 B2
(45) Date of Patent: Oct. 27, 2020

(54) CAMERA OPTICAL LENS

(71) Applicant: AAC Technologies Pte. Ltd., Singapore (SG)

(72) Inventor: ChiaCheng Lin, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 91 days.

(21) Appl. No.: 16/362,842

(22) Filed: Mar. 25, 2019

(65) Prior Publication Data
US 2020/0041763 A1 Feb. 6, 2020

(30) Foreign Application Priority Data
Aug. 3, 2018 (CN) .......................... 2018 1 0880380

(51) Int. Cl.
G02B 9/60 (2006.01)
G02B 13/18 (2006.01)
G02B 13/00 (2006.01)

(52) U.S. Cl.
CPC ........... *G02B 9/60* (2013.01); *G02B 13/0045* (2013.01)

(58) Field of Classification Search
CPC .............................. G02B 9/60; G02B 13/0045
USPC .................................. 359/714, 753, 763, 764
See application file for complete search history.

(56) References Cited

U.S. PATENT DOCUMENTS

2016/0274333 A1* 9/2016 Tang .................. G02B 9/60

* cited by examiner

*Primary Examiner* — William Choi
(74) *Attorney, Agent, or Firm* — IPro, PLLC; Na Xu

(57) ABSTRACT

A camera optical lens, includes a first lens power, a second lens, a third lens, a fourth lens, and a fifth lens. A focal length of the camera optical lens is f, a focal length of the first lens is f1, a focal length of the third lens is f3, a focal length of the fourth lens is f4, a refractive power of the fourth lens is n4, an axial distance from an image side of the fourth lens to an object side of the fifth lens is d8, an effective half caliber of an image side of the fourth lens is SD8, the maximum image height of the camera optical lens is ImgH, an optical total length of the camera optical lens is TTL. The camera optical lens satisfies conditions: 0.5<f1/f<1; 1.55<n4<1.7; −3<f3/f4<−0.5; 0.2<SD8/ImgH<0.5; and 0.07<d8/TTL<0.3.

5 Claims, 2 Drawing Sheets

CAMERA OPTICAL LENS

FIELD OF THE PRESENT DISCLOSURE

The invention relates to the field of optical lenses, in particular to a camera optical lens suitable for portable terminal devices such as smart phones, digital cameras, etc.

DESCRIPTION OF RELATED ART

In recent years, with the rise of smart phones, the demand for miniaturized photographic lenses is increasing, and the common photographic lens is no more than a Charge Coupled Device (CCD) or a Complementary Metal-Oxide Semiconductor (CMOS) sensor, and the pixel size of the photosensitive device is reduced due to the refinement of semiconductor manufacturing technology, coupled with the development trend of current electronic products with good functions and thin, thin and short shapes, so the miniaturized photographic lens with good imaging quality has become the mainstream in the current market.

In order to obtain better imaging quality, the traditional lens mounted on the mobile phone camera usually adopts a three-piece or four-piece lens structure. However, with the development of technology and the increase of users' diversified demands, the five-piece lens structure gradually appears in the lens design under the condition that the pixel area of the photosensitive device is constantly shrinking and the system's requirements for imaging quality are constantly improving. However, the common five-piece lens has a large optical effective half caliber and cannot reduce the lens size and realize the lightweight and miniaturization of the lens.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure hereinafter is described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Figure 1:
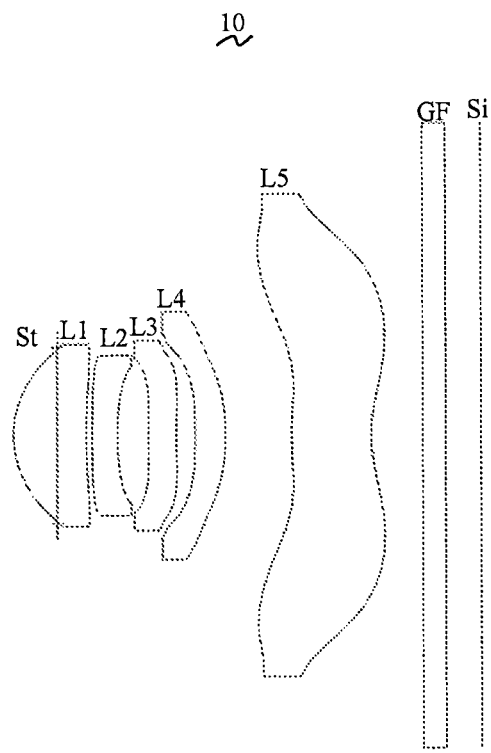
FIG. 1 is a schematic structural diagram of an embodiment of a camera optical lens of the present invention.

Referring to the drawings, the present invention provides a camera optical lens 10. FIG. 1 shows a camera optical lens 10 according to an embodiment of the present invention, and the camera optical lens 10 includes five lenses. Specifically, the camera optical lens 10 sequentially includes an aperture St, a first lens L1 with positive refractive power, a second lens L2 with negative refractive power, a third lens L3 with negative refractive power, a fourth lens L4 with positive refractive power, and a fifth lens L5 with negative refractive power from an object side to an image side. An optical element such as an optical filter GF may be provided between the fifth lens L5 and the imaging surface Si.

The first lens L1 has a positive refractive power, which can effectively reduce the system length, its object side protrudes outward as a convex surface, and the aperture St is arranged between the object and the first lens L1. The second lens L2 has negative refractive power. The third lens L3 has negative refractive power. The fourth lens L4 has positive refractive power. In this embodiment, the image sides of the fourth lens L4 are both convex. The fifth lens L5 has negative refractive power. In this embodiment, the object side of the fifth lens L5 is convex, and the image side is concave.

Here, the focal length of the whole camera optical lens 10 is defined as f, the focal length of the first lens L1 is f1, the focal length of the third lens L3 is f3, the focal length of the fourth lens L4 is f4, the focal length of the fourth lens L4 is n4, the axial distance from the image side of the fourth lens L4 to the object side of the fifth lens L5 is d8, the effective half caliber of the image side of the fourth lens L4 is SD8, the maximum image height of the whole camera optical lens is ImgH, and the total optical length of the whole camera optical lens 10 is TTL and $0.5<f1/f<1, 1.55<n4<1.7, -3<f3/f4<-0.5, 0.2<SD8/ImgH<0.5, 0.07<d8/TTL<0.3$.

Compared with the prior art, in the embodiment of the present invention, the focal length f of the camera optical lens 10 and the focal length f1 of the first lens L1, the focal length f2 of the third lens L2 and the focal length f4 of the fourth lens L4, the refractive power n4 of the fourth lens L4, the effective half caliber SD8 of the image side of the fourth lens L4, the axial distance d8 from the image side of the fourth lens L4 to the object side of the fifth lens L5, and the optical total length TTL of the camera optical lens can be controlled/adjusted when the above relationship is satisfied, while the fourth lens L4 is configured with high refractive power optical material, which makes the effective half-caliber size of the image side of the fourth lens L4 reduced when the refractive power n4 of the fourth lens L4 satisfies the above formula, and the overall imaging optical lens 10 can be reduced in volume, thereby realizing the lightweight and miniaturization of the imaging optical lens 10.

Specifically, in the embodiment of the present invention, the focal length of the overall camera optical lens 10 is f, the focal length of the first lens L1 is f1, the focal length of the second lens L2 is f2, the focal length of the third lens L3 is f3, the focal length of the fourth lens L4 is f4, and the focal length of the fifth lens L5 is f5 in millimeters (mm), satisfying the following relationship: $0.5<f1/f<1, -4<f2/f<-1, -6<f3/f<-1.5, 1<f4/f<5, -4<f5/f<-1$. With such a design, the total optical length TTL of the overall camera optical lens 10 can be made as short as possible, and the characteristics of miniaturization can be maintained.

Specifically, in the inventive embodiment, the focal length of the first lens L1 is n1, the focal length of the second lens L2 is n2, the focal length of the third lens L3 is n3, and the focal length of the fifth lens L5 is n5, satisfying the following relationship: $1.4<n1<1.55, 1.55<n2<1.7, 1.55<n3<1.7, 1.4<n5<1.55$. The second lens L2 and the third lens L3 is made of high refractive power optical materials, which can effectively reduce system lateral color. The fifth lens L5 is made of low refractive power optical material, which can effectively reduce the size of the system.

Specifically, in the embodiment of the present invention, the Abbe number of the first lens L1 is v1, the Abbe number of the second lens L2 is v2, the Abbe number of the third lens L3 is v3, the Abbe number of the fourth lens L4 is v4, and the Abbe number of the fifth lens L5 is v5, satisfying the following relationship: $50<v1<65, 10<v2<35, 10<v3<35, 10<v4<35, 50<v5<65$. The second lens L2, the third lens L3, and the fourth lens L4 is made of low Abbe number optical materials, which can effectively reduce the system color difference.

In the camera optical lens 10 of the present invention, the material of each lens can be glass or plastic. If the material of the lens is glass, the freedom of the arrangement of the refractive power of the optical system of the present invention can be increased. If the material of the lens is plastic, the production cost can be effectively reduced.

In the embodiment of the invention, the materials of the first lens, the second lens, the third lens, the fourth lens, and the fifth lens are all plastic, which can effectively reduce the production cost.

In addition, the surface of the lens can be set as an aspheric surface, and the aspheric surface can be easily made into a shape other than a spherical surface to obtain more control variables for reducing aberration and further reducing the number of lenses used, so that the total length of the camera optical lens of the present invention can be effectively reduced. In the embodiment of the invention, the object side and the image side of each lens are aspheric.

The embodiment of the present invention can control/adjust the configuration of the refractive power of each lens through the above relationship, and at the same time can reduce the volume of the overall camera optical lens 10, thereby realizing high-performance miniaturization, head narrowing, and sensitivity improvement of the camera optical lens 10.

Preferably, the object side and/or the image side of the lens may also be provided with inflection points and/or arrest points to meet high-quality imaging requirements, with specific embodiments described below.

The design data of the camera optical lens 10 according to the embodiment of the present invention is shown below.

Tables 1 and 2 show data of the camera optical lens 10 according to the embodiment of the present invention.

TABLE 1

| Focal length (mm) | |
|---|---|
| f | 3.851 |
| f1 | 2.814 |
| f2 | −7.814 |
| f3 | −11.387 |
| f4 | 8.697 |
| f5 | −7.446 |
| f12 | 3.796 |

The meaning of each symbol is as follows:
F: focal length of the camera optical lens 10;
f1: The focal length of the first lens L1;
f2: The focal length of the second lens L2;
f3: Focal length of the third lens L3;
f4: Focal length of the fourth lens L4;
f5: Focal length of the fifth lens L5;
f12: The combined focal length of the first lens L1 and the second lens L2.

TABLE 2

| | | The radius of curvature (R) (mm) | Thickness/distance (d) (mm) | | Effective half caliber (SD) mm | | Refractive power (nd) | | Abbe number (vd) |
|---|---|---|---|---|---|---|---|---|---|
| St | St | ∞ | d0= | −0.4 | | | | | |
| L1 | R1 | 1.229 | d1= | 0.665 | SD1 | 0.975 | nd1 | 1.544 | v1 | 56 |
| | R2 | 4.966 | d2= | 0.058 | SD2 | 0.891 | | | |
| L2 | R3 | 12.303 | d3= | 0.23 | SD3 | 0.855 | nd2 | 1.661 | v2 | 20.4 |
| | R4 | 3.641 | d4= | 0.288 | SD4 | 0.737 | | | |
| L3 | R5 | 38.167 | d5= | 0.253 | SD5 | 0.813 | nd3 | 1.661 | v3 | 20.4 |
| | R6 | 6.334 | d6= | 0.172 | SD6 | 1.016 | | | |
| L4 | R7 | −10.151 | d7= | 0.276 | SD7 | 1.091 | nd4 | 1.636 | v4 | 24 |
| | R8 | −3.639 | d8= | 0.605 | SD8 | 1.326 | | | |
| L5 | R9 | 3.32 | d9= | 0.732 | SD9 | 2.397 | nd5 | 1.535 | v5 | 56.1 |
| | R10 | 1.675 | d10= | 0.4747 | SD10 | 2.588 | | | |
| Glass | R11 | ∞ | d11= | 0.21 | \ | \ | \ | \ | \ | \ |
| | R12 | ∞ | d12= | 0.32 | | | | | |

Among them, R1 and R2 are the object side and image side of the first lens L1, R3 and R4 are the object side and image side of the second lens L2, R5 and R6 are the object side and image side of the third lens L3, R7 and R8 are the object side and image side of the fourth lens L4, R9 and R10 are the object side and image side of the fifth lens L5, and R11 and R12 are the object side and image side of the optical filter GF. Other symbols have the following meanings.

d0: The distance on the axis from the aperture St to the object side of the first lens L1;

d1: Axial thickness of the first lens L1;

d2: The distance on the axis from the image side of the first lens L1 to the object side of the second lens L2;

d3: Axial thickness of the second lens L2;

d4: The distance on the axis from the image side of the second lens L2 to the object side of the third lens L3;

d5: Axial thickness of the third lens L3;

d6: Axial distance from the image side of the third lens L3 to the object side of the fourth lens L4;

d7: Axial thickness of the fourth lens L4;

d8: Axial distance from the image side of the fourth lens L4 to the object side of the fifth lens L5;

d9: Axial thickness of the fifth lens L5;

d10: The axial distance from the image side of the fifth lens L5 to the object side of the optical filter GF;

d11: Axial thickness of optical filter GF;

d12: The axial distance from the image side of the optical filter GF to the imaging surface;

SD1: The effective half caliber of the object side of the first lens L1;

SD2: The effective half caliber of the image side of the first lens L1;

SD3: The effective half caliber of the object side of the second lens L2;

SD8: The effective half caliber of the image side of the second lens L2;

SD5: The effective half caliber of the object side of the third lens L3;

SD6: The effective half caliber of the image side of the third lens L3;

SD7: The effective half caliber of the object side of the fourth lens L4;
SD8: The effective half caliber of the image side of the fourth lens L4;
SD9: The effective half caliber of the object side of the fifth lens L5;
SD10: The effective half caliber of the image side of the fifth lens L5;
nd1: refractive power of the first lens L1;
nd2: refractive power of the second lens L2;
nd3: refractive power of the third lens L3;
nd4: refractive power of the fourth lens L4;
nd5: refractive power of the fifth lens L5;
v1: Abbe number of the first lens L1;
v2: Abbe number of the second lens L2;
v3: Abbe number of the third lens L3;
v4: Abbe number of the fourth lens L4;
v5: Abbe number of the fifth lens L5;

Table 3 shows aspheric data of each lens in the camera optical lens 10 according to the embodiment of the present invention.

distance between the arrest point set on each lens surface and the optical axis of the camera optical lens 10.

TABLE 4

|  | Number of inflexion points | Inflexion point position 1 | Inflexion point Position 2 | Inflexion point position 3 |
|---|---|---|---|---|
| R1 | 1 | 0.935 | | |
| R2 | 1 | 0.485 | | |
| R3 | 0 | | | |
| R4 | 0 | | | |
| R5 | 1 | 0.095 | 0.955 | |
| R6 | 3 | 0.215 | 0.885 | 0.995 |
| R7 | 2 | 0.925 | 1.055 | |
| R8 | 2 | 0.855 | 1.045 | |
| R9 | 3 | 0.285 | 1.255 | 2.325 |
| R10 | 3 | 0.515 | 2.215 | 2.515 |

TABLE 3

| | Conical coefficient | Aspheric coefficient | | | | |
|---|---|---|---|---|---|---|
| | k | A4 | A6 | A8 | A10 | A12 |
| R1 | −8.4062E+00 | 5.4948E−01 | −9.8772E−01 | 1.9411E+00 | −2.2266E+00 | −2.6033E−01 |
| R2 | −3.8374E+01 | −1.2985E−01 | 3.8160E−01 | −1.1107E+00 | 2.0516E+00 | −1.5401E+00 |
| R3 | −4.2229E+02 | −8.4786E−02 | 1.9268E−01 | 5.2537E−01 | −1.2370E+00 | −4.8119E+00 |
| R4 | 1.1669E+00 | 6.0005E−02 | −3.1043E−01 | 3.6296E+00 | −9.1263E+00 | −1.4458E+01 |
| R5 | 2.5221E+02 | −2.6798E−01 | −7.9768E−01 | 3.3155E+00 | −2.1842E+01 | 5.9381E+01 |
| R6 | −5.0962E+02 | −1.2760E−01 | −2.5631E−01 | 1.2933E+00 | −4.3260E+00 | 5.9198E+00 |
| R7 | 6.5754E+01 | −4.0209E−01 | 7.3864E−01 | −7.8048E−01 | −7.6512E−01 | 2.7553E+00 |
| R8 | −6.9000E+01 | −5.1848E−01 | 9.3481E−01 | −1.2344E+00 | 1.1037E+00 | −4.4170E−01 |
| R9 | −3.0450E+01 | −2.7684E−01 | 1.5675E−01 | −4.3113E−02 | 6.0007E−03 | −5.5872E−05 |
| R1 | −8.4498E+00 | −1.1394E−01 | 4.4911E−02 | −1.3163E−02 | 2.0917E−03 | −7.1745E−05 |

| | Aspheric coefficient | | | |
|---|---|---|---|---|
| | A14 | A16 | A18 | A20 |
| R1 | 5.0776E+00 | −7.3263E+00 | 4.6200E+00 | −1.1488E+00 |
| R2 | −1.6824E−01 | −4.8439E−01 | 2.2760E+00 | −1.3739E+00 |
| R3 | 2.8137E+01 | −5.5947E+01 | 5.1668E+01 | −1.8581E+01 |
| R4 | 1.5330E+02 | −4.0403E+02 | 4.8794E+02 | −2.3056E+02 |
| R5 | −4.7042E+01 | −1.0468E+02 | 2.4563E+02 | −1.4676E+02 |
| R6 | 1.4677E−03 | −9.7817E+00 | 1.0909E+01 | −3.8179E+00 |
| R7 | −2.7069E+00 | 3.0174E+00 | 1.2852E+00 | −6.2319E−01 |
| R8 | −7.4175E−02 | 1.1931E−01 | −2.9831E−02 | 1.1258E−03 |
| R9 | −1.3744E−04 | 2.5455E−05 | −2.0767E−06 | 6.5573E−08 |
| R1 | −3.0548E−05 | 2.9186E−06 | 3.4987E−07 | −4.3254E−08 |

Table 4 and Table 5 show the design data of the inflection point and the arrest point of each lens in the camera optical lens 10 according to the embodiment of the present invention. Among them, R1 and R2 respectively represent the object side and image side of the first lens L1, R3 and R4 respectively represent the object side and image side of the second lens L2, R5 and R6 respectively represent the object side and image side of the third lens L3, R7 and R8 respectively represent the object side and image side of the fourth lens L4, and R9 and R10 respectively represent the object side and image side of the fifth lens L5. The corresponding data in the "inflection point position" field is the vertical distance from the inflection point set on each lens surface to the optical axis of the camera optical lens 10. The "arrest point position" field corresponds to the vertical

TABLE 5

|  | Number of arrest points | Arrest point position 1 | Arrest point position 2 |
|---|---|---|---|
| R1 | 0 | | |
| R2 | 1 | 0.845 | |
| R3 | 0 | | |
| R4 | 0 | | |
| R5 | 1 | 0.155 | |
| R6 | 1 | 0.385 | |
| R7 | 0 | | |
| R8 | 0 | | |
| R9 | 2 | 0.515 | 2.015 |
| R10 | 1 | 1.075 | |

Figure 2:
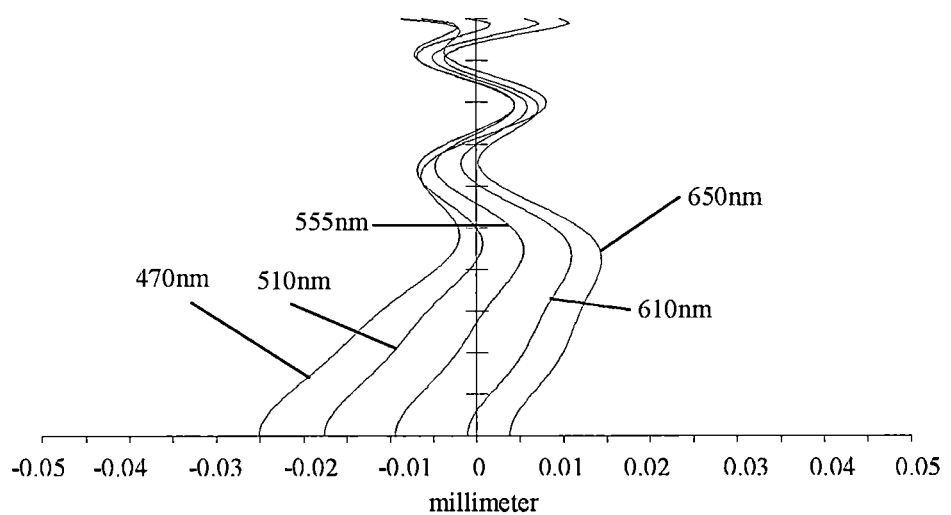
FIG. 2 is a longitudinal aberration diagram of the camera optical lens shown in FIG. 1.
Figure 3:
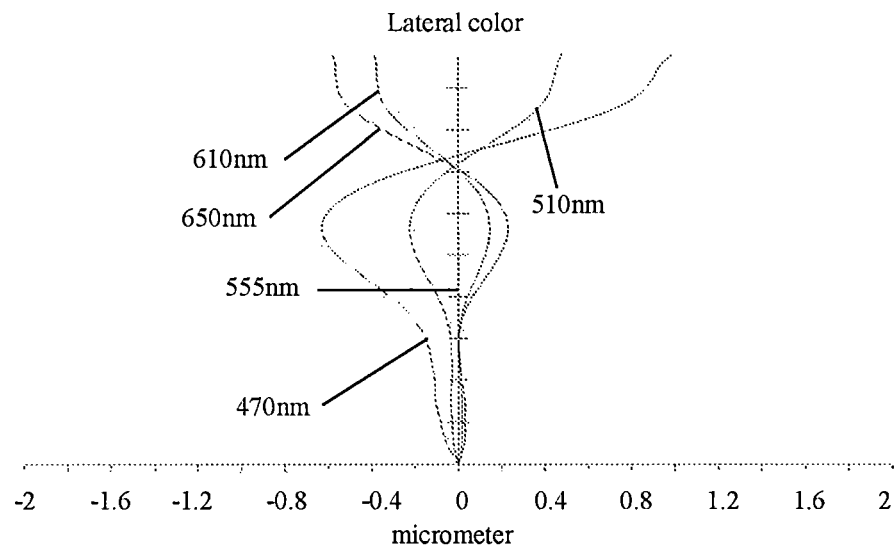
FIG. 3 is a lateral color diagram of the camera optical lens shown in FIG. 1.
Figure 4:
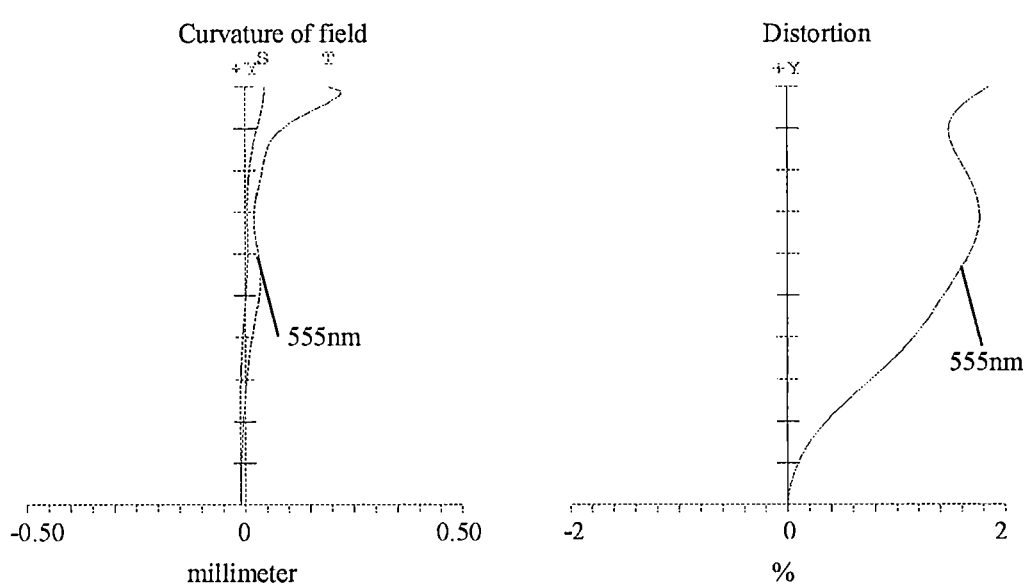
FIG. 4 is a schematic diagram of curvature of field and distortion of the camera optical lens shown in FIG. 1.

FIGS. 2 and 3 show longitudinal aberration and lateral color of light with wavelengths of 470 nm, 510 nm, 555 nm, 610 nm and 650 nm after passing through the camera optical lens 10 of the embodiment, respectively. FIG. 4 shows the astigmatic curvature of field and distortion of light with a wavelength of 555 nm after passing through the camera optical lens 10 of the embodiment.

Table 6 below lists the values corresponding to each conditional formula in this embodiment according to the above conditional formula. Apparently, the camera optical lens 10 of this embodiment satisfies the above conditional formula.

TABLE 6

| Conditions | |
|---|---|
| 0.5 < f1/f < 1 | 0.731 |
| 1.55 < n4 < 1.7 | 1.636 |
| −3 < f3/f4 < −0.5 | −1.309 |
| 0.2 < SD8/ImgH < 0.5 | 0.410 |
| 0.07 < d8/TTL < 0.3 | 0.141 |

In this embodiment, the entrance pupil diameter of the camera optical lens is 1.88777 mm, the maximum image height ImgH of the overall camera optical lens is 3.238 mm, and the viewing angle in the diagonal direction is 77.81°.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera optical lens, comprising, in a sequence, an aperture, a first lens with positive refractive power, a second lens with negative refractive power, a third lens with negative refractive power, a fourth lens with positive refractive power, and a fifth lens with negative refractive power from the object side to the image side; wherein a focal length of the camera optical lens is defined as f, a focal length of the first lens is defined as f1, a focal length of the third lens is defined as f3, a focal length of the fourth lens is defined as f4, a refractive power of the fourth lens is defined as n4, an axial distance from an image side of the fourth lens to an object side of the fifth lens is defined as d8, an effective half caliber of an image side of the fourth lens is defined as SD8, the maximum image height of the camera optical lens is defined as ImgH, an optical total length of the camera optical lens is defined as TTL, and the camera optical lens satisfies following conditions:

$0.5 < f1/f < 1;$ $1.55 < n4 < 1.7;$ $-3 < f3/f4 < -0.5;$ $2 < SD8/ImgH < 0.5;$ and $0.07 < d8/TTL < 0.3.$ 2. The camera optical lens as described in claim 1 further satisfying the following conditions:

$0.5 < f1/f < 1;$ $-4 < f2/f < -1;$ $-6 < f3/f < -1.5;$ $1 < f4/f < 5;$ and $-4 < f5/f < -1;$ where, f2: focal length of the second lens;
f5: focal length of the fifth lens.

3. The camera optical lens as described in claim 1 further satisfying the following conditions:

$1.4 < n1 < 1.55;$ $1.55 < n2 < 1.7;$ $1.55 < n3 < 1.7;$ $1.4 < n5 < 1.55;$ where n1: refractive power of the first lens;
n2: refractive power of the second lens;
n3: refractive power of the third lens;
n5: refractive power of the fifth lens.

4. The camera optical lens as described in claim 1 further satisfying the conditions:

$50 < v1 < 6;$ $10 < v2 < 35;$ $10 < v3 < 35;$ $10 < v4 < 35;$ $50 < v5 < 65;$ where v1: Abbe number of the first lens;
v2: Abbe number of the second lens;
v3: Abbe number of the third lens;
v4: Abbe number of the fourth lens;
v5: Abbe number of the fifth lens.

5. The camera optical lens as described in claim 1, wherein the first lens, the second lens, the third lens, the fourth lens and the fifth lens are made of plastic.

* * * * *